RIPPLE ADD AND RIPPLE SUBTRACT BINARY COUNTERS

Filed Nov. 30, 1966 2 Sheets-Sheet 1

INVENTORS
David H. Schaefer &
Rodger A. Cliff

BY Glenn C. Cay
Carl Levy

ATTORNEYS

Oct. 6, 1970 D. H. SCHAEFER ET AL 3,532,866

RIPPLE ADD AND RIPPLE SUBTRACT BINARY COUNTERS

Filed Nov. 30, 1966 2 Sheets-Sheet 2

INVENTORS
David H. Schaefer &
Rodger A. Cliff

BY [signature]
[signature]
ATTORNEYS

United States Patent Office 3,532,866
Patented Oct. 6, 1970

3,532,866

RIPPLE ADD AND RIPPLE SUBTRACT BINARY COUNTERS

David H. Schaefer, Silver Spring, and Rodger A. Cliff, College Park, Md., assignors to the United States of America as represented by the Administrator of the National Aeronautics and Space Administration Filed Nov. 30, 1966, Ser. No. 598,120
Int. Cl. G06f *7/50*
U.S. Cl. 235—175 5 Claims

ABSTRACT OF THE DISCLOSURE

There is disclosed herein a system for adding and subtracting binary numbers by adding or subtracting a number contained in one binary counter or register, from or to a number contained in a second counter. The output of each stage of the first counter is directly coupled to the input of its binary equivalent stage of the second counter. The outputs from the first counter's binary stages trigger the second counter's binary stages. If the second counter is a forward counter addition is performed; if the second counter is a backward counter subtraction is performed.

The invention described herein was made by employees of the United States Government and may be manufactured and used by or for the Government for governmental purposes without the payment of any royalties thereon or therefor.

Methods and apparatus for adding and subtracting binary numbers are well known. The devices are normally used in computer systems to perform arithmetic computations. Normally, one number is placed in one counter or register and the second number is placed in a second counter or register. The numbers are then added or subtracted in binary adding and subtracting networks as desired. Hence, prior art devices for adding or subtracting normally require a minimum of two counters or registers and an addition or subtraction network.

Because of this requirement for separate electronic networks to add and subtract binary numbers, prior art devices are unreliable to the extent that they use additional components to perform the addition and subtraction functions, and each additional component reduces the reliability of the overall system. Moreover, additional components add to the size and weight of the system. These factors become important when a computer incorporating addition and subtraction circuits is used in certain environments. Specifically, when the computer is used aboard an orbiting satellite or other type of space vehicle, the reliability, size, and weight of the system become of more vital importance. Hence, it is desirable to reduce the size and weight and improve the reliability of computer addition and subtraction systems for use in this or other similarly remote environments.

It is an object of this invention to provide new and improved binary addition and subtraction systems.

It is also an object of this invention to provide new and improved binary addition and subtraction systems which do not require the use of separate addition and subtraction networks.

It is also an object of this invention to provide a new and improved binary addition network wherein the number to be added is directly inserted into a counter containing the number to which it is to be added.

It is still a further object of this invention to provide a new and improved binary subtraction network wherein the number to be subtracted is directly subtracted from a counter containing the number from which it is to be subtracted.

It is a still further object of this invention to provide a new and improved binary adder or subtractor that is small, lightweight, and reliable.

In accordance with a principle of the invention, a novel binary adder circuit is provided by coupling the output of each stage of a first counter or register to the trigger input of equal valued stages of a second counter. That is, coupling the lowest value binary stage of the first counter to the lowest value binary stage of the second counter results in adding the lowest digit of the number in the first counter to the second counter. Further, the same stage-to-stage coupling for each stage results in adding the number in the first counter to the number in the second counter. More specifically, coupling the second valued stage of the first counter to the second valued stage of the second counter results in adding the second valued digit. Coupling the third valued stage of the first counter to the third valued stage of the second counter results in adding the third valued digit. In this manner, a novel system is provided for adding the number in the first binary counter to the number in the second binary counter without the use of a separate add circuit.

In accordance with a further principle of the invention, the number in the first counter can be subtracted from the number in the second counter if the second counter is a backward counter; that is, subtraction occurs if the second counter reduces its number each time an input signal is applied to its stages. By coupling the output of each stage of the first counter to the input of its equal valued stage in the second counter, the number in the first counter is directly subtracted from the number in the second counter.

It will be appreciated by those skilled in the art and others that the foregoing system provides a very simple means of adding or subtracting binary numbers. In essence, all that is required is a direct coupling between equal valued stages of the two counters. If the second counter is a forward counter addition occurs; and if the second counter is a backward counter subtraction occurs.

The foregoing objects and many of the attendant advantages of this invention will become more readily appreciated as the same become better understood by reference to the following detailed description when taken in conjunction with the accompanying drawings, wherein.

Figure 1:
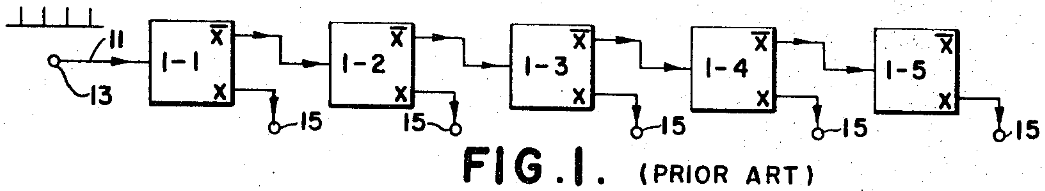
FIG. 1. (PRIOR ART)
FIG. 1 is a block diagram illustrating a conventional, prior art, binary counter.

Turning now to the drawings, FIG. 1 is a block diagram of a conventional, prior art ripple counter. The counter illustrated in FIG. 1 comprises five stages designated 1–1 through 1–5. Each stage has an input and two outputs; the outputs are designated as the true output X and the complementary output $\overline{X}$. The input to the first stage is connected via a line 11 to an input terminal 13. The $\overline{X}$ output from the first stage is connected to the input of the second stage; the $\overline{X}$ output from the second stage is connected to the input of the third stage; the $\overline{X}$ output of the third stage is connected to the input of the fourth stage; and the $\overline{X}$ output of the fourth stage is connected to the input of the fifth stage. The X output of each stage is connected to an output terminal 15.

As is conventional, the X output from any stage can have a 0 (no voltage) condition or a 1 (voltage) condition. The $\overline{X}$ output is the complement of the X output for any predetermined condition; that is, if the X output is 0 the $\overline{X}$ output is 1 and if the X output is 1 the $\overline{X}$ output is 0. Further, for purposes of illustration, each stage is triggered by a 1; that is, the transition of the input signal from a 0 to a 1 triggers each stage. For example, if $\overline{X}$ of stage 1–1 goes from 0 to 1, it triggers the stage 1–2.

Prior to inserting a pulse into the counter all of the X outputs are 0 and all of the $\overline{X}$ outputs are 1. When a pulse is applied to the first stage 1–1, it triggers that stage, switching the outputs; that is, the X output switches from 0 to 1 and the $\overline{X}$ output switches from 1 to 0. Because the $\overline{X}$ output is 0 there has been no transition from 0 to 1, however, and stage 1–2 is not triggered.

Upon the occurrence of a second pulse, the first stage again switches; that is, the X output switches to 0 and the $\overline{X}$ output switches to 1. Because the $\overline{X}$ output becomes a 1, it triggers the second stage 1–2 to switch its outputs, that is 1–2's X output becomes 1 and its $\overline{X}$ output becomes 0. Hence, after the first two pulses have occurred, the output from the five stages—reading from left to right—is 01000. Upon the occurrence of a third pulse stage 1–1 again switches and the output reads 11000. In this manner prior art ripple counters of the type illustrated in FIG. 1 count pulses.

Figure 2:
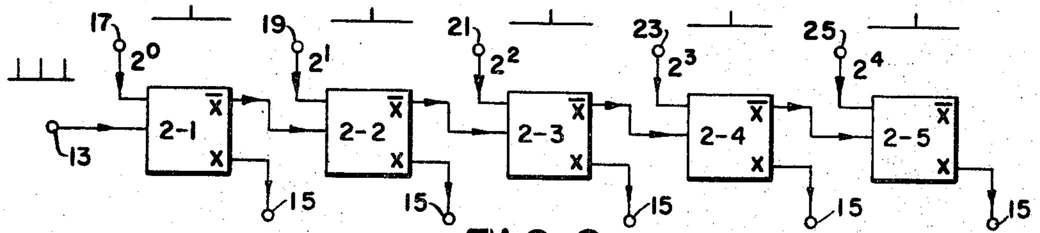
FIG. 2 is a block diagram illustrating the general concept of this invention.

FIG. 2 is a block diagram illustrating an apparatus for adding a binary number to a counter in accordance with the invention. FIG. 2 comprises five binary counter stages illustrated as 2–1 through 2–5, respectively. The input to 2–1 is connected to the input terminal 13. The $\overline{X}$ output of each stage is connected to the input to the subsequent stage in a manner similar to that illustrated in FIG. 1. The X output to each stage is connected to an output terminal 15. By this connection stage 2–1 is the lowest significant digit; stage 2–2 is the next highest significant digit; stage 2–3 is the next highest; stage 2–4 is the next highest; and stage 2–5 is the highest significant digit.

In addition, FIG. 2 illustrates a second input to each stage from separate input terminals. That is, a first separate input terminal 17 is connected to the input of 2–1. A second separate input terminal 19 is connected to the input of 2–2 and a third separate input 21 is connected to the input of 2–3. Similarly, a fourth separate input 23 is connected to the input of 2–4 and a fifth separate input terminal 25 is connected to the input of 2–5. While the separate inputs are illustrated as separate inputs to each stage, in reality they arrive at the same point as the input from the previous stage. They are, however, illustrated as separate lines because in a specific application of the invention, isolation diodes would be contained in the stage input lines to prevent feedback.

In accordance with the invention, the block diagram system illustrated in FIG. 2 can add two binary numbers. One number is contained in the counter; it may have been put there through the application of a pulse chain to the input terminal 13 in a conventional manner as described with respect to FIG. 1, for example. Assume that the binary number 10110 is contained in the counter; this binary number is equivalent to the decimal number 13. Also assume that it is desired to add the binary number 11010 to the number 10110. This second number (11010) is equivalent to the decimal number 11 and is applied to the separate input terminals 17–25 of the counter stages 2–1 through 2–5, respectively. Specifically, a 1 is applied to the separate input 17 of stage 2–1; a 1 is applied to the separate input 19 of stage 2–2; a 0 is applied to the separate input 21 of stage 2–3; a 1 is applied to the separate input 23 of stage 2–4; and a 0 is applied to the separate input 25 of stage 2–5.

Assume that the separate inputs are sequentially applied in a right to left direction. When the 0 is applied to the separate input 25 of 2–5 nothing occurs; the output terminal 15 of stage 2–5 remains at 0. Hence, at this point the output from the counter is still 10110.

When the 1 input is applied to the separate input 23 of 2–4 it causes that stage to switch. When stage 2–4 switches, its X output goes from 1 to 0 and its $\overline{X}$ output goes from 0 to 1 which triggers 2–5 to switch its X and $\overline{X}$ outputs from 1 to 0 and 0 to 1, respectively. Hence, at this point the X outputs of the stages are 10101.

When the 0 input is applied to the separate input terminal 21 of 2–3 it creates no change. Hence, the output remains 10101.

When the 1 is applied to the separate input terminal 19 of 2–2 it causes 2–2 to switch its X output from 0 to 1, and its $\overline{X}$ output from 1 to 0. Because $\overline{X}$ of 2–2 merely goes to 0, 2–3 does not switch. At this point the counter's combined output is 11101.

When the 1 input is applied to the separate input terminal 17 of 2–1, it causes that stage to switch its X output from 1 to 0 and its $\overline{X}$ output from 0 to 1. When 2–1's output goes from a 0 to 1 it triggers 2–2. When 2–2 is triggered, its X output goes from 1 to 0 and its $\overline{X}$ output goes from 0 to 1. When the $\overline{X}$ output 2–2 goes from 0 to 1, it triggers 2–3. When 2–3 is triggered, its X output goes from 1 to 0 and its $\overline{X}$ output goes from 0 to 1 to trigger 2–4. When 2–4 is triggered, its X output goes from 0 to 1 and its $\overline{X}$ goes from 1 to 0. Because its $\overline{X}$ output goes from 1 to 0, 2–5 is not triggered. Hence, the final output is 00011, which is 24 in decimal numbers which is equal to 13 plus 11.

The foregoing has described an apparatus for adding two binary numbers. The addition function occurred because the counter was connected as a forward ripple counter; however, if the counter were connected as backward counter the 11 would have been subtracted from the 13. The subtraction function will be more fully discussed hereinafter with respect to the operation of FIGS. 5 and 6.

It will be appreciated that the foregoing description of FIG. 2 describes a simple apparatus for adding one binary number to another binary number. Essentially the invention requires that the output from each stage of one counter or register be applied to the input of a corresponding stage in a second counter. Preferably, triggering pulses cause a time sequential application of the outputs from the stages of one counter to the second counter to provide a "settling down" time after each switching operation. This sequential operation is accomplished in an add system by the apparatus illustrated in FIGS. 3 and 4; and it is accomplished for a subtract system by the apparatus illustrated in FIGS. 5 and 6.

Figure 3:
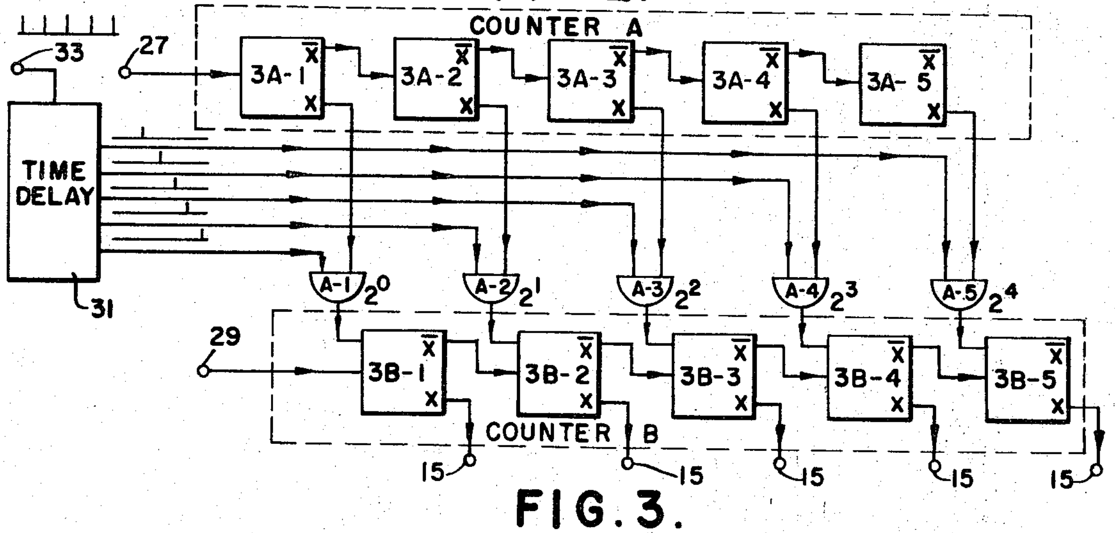
FIG. 3 is a block diagram illustrating one system made in accordance with the invention for adding one binary number to a second binary number.

FIG. 3 comprises a first counter designated counter A and a second counter designated counter B. A is a five stage counter with the stages being designated as 3A–1 through 3A–5, respectively; similarly, counter B is a five stage counter with the stages designated as 3B–1 through 3B–5, respectively. An input terminal 27 is connected to the input of the first stage 3A–1 of counter A; and an input terminal 29 is connected to the input of the first stage 3B–1 of counter B. The $\overline{X}$ output of each stage of counters A and B is connected to the input of the subsequent stage in the manner illustrated in FIGS. 1 and 2. The X outputs of counter B are each connected to one of a plurality of output terminals 15.

In addition to the counters, the system illustrated in FIG. 3 includes five two-input AND gates designated as A–1 through A–5, respectively, and a time delay circuit 31. The X output of stage 3A–1 is connected to one input of A–1 and the X output of stage 3A–2 is connected to one input of A–2. The X output of 3A–3 is connected to one input of A–3 and the X output of 3A–4 is connected to one input of gate A–4. Finally, the X output of 3A–5 is connected to one input of gate A–5.

The output of A–1 is connected to the separate input of 3B–1; the output of A–3 is connected to the separate input of 3B–2; the output of A–3 is connected to the separate input of 3B–3; the output of A–4 is connected to the separate input of 3B–4; and the output of A–5 is connected to the separate input of 3B–5.

A timing pulse is applied to the time delay circuit 31 via an input terminal 33. The time delay network distributes the timing pulse to a plurality of lines connected to the second inputs of the AND gates A–1 through A–5 so that the gates are switched on sequentially. That is, A–5 receives the first timing pulse; A–4 receives the second timing pulse; A–3 receives the third timing pulse; A–2 receives the fourth timing pulse; and A–1 receives the fifth or last timing pulse. By this timing arrangement the outputs of stages 3A–1 through 3A–5 are sequentially fed into stages 3B–1 through 3B–5 with the highest value being fed first and the lower values following in descending order.

The operation of Counter B illustrated in FIG. 3 is identical to the operation of the counter illustrated in FIG. 2 with Counter A acting as the location of the second number. That is, a number from Counter A is added to a number in Counter B exactly as the number 11 was added to the number 13 in the description of the operation of the counter illustrated in FIG. 2. The gates and time delay sections are provided to eliminate the problem of a stage, such as 3B–3, receiving a pulse from A–3 at the same time it received a pulse from 3B–2. If this were permitted to occur these two pulses would be interpreted by 3B–3 as one pulse and 3B–3 would only switch once, whereas, for correct system operation it is necessary for 3B–3 to switch twice for two pulses. Hence, the timing system provides for a "settle down" period after each stage input has been added before a lower order stage input is added. For example, a time is allowed for the system to settle down after 3A–5 is added to 3B–5 and prior to 3A–4 being added to 3B–4.

Figures 4, 6:
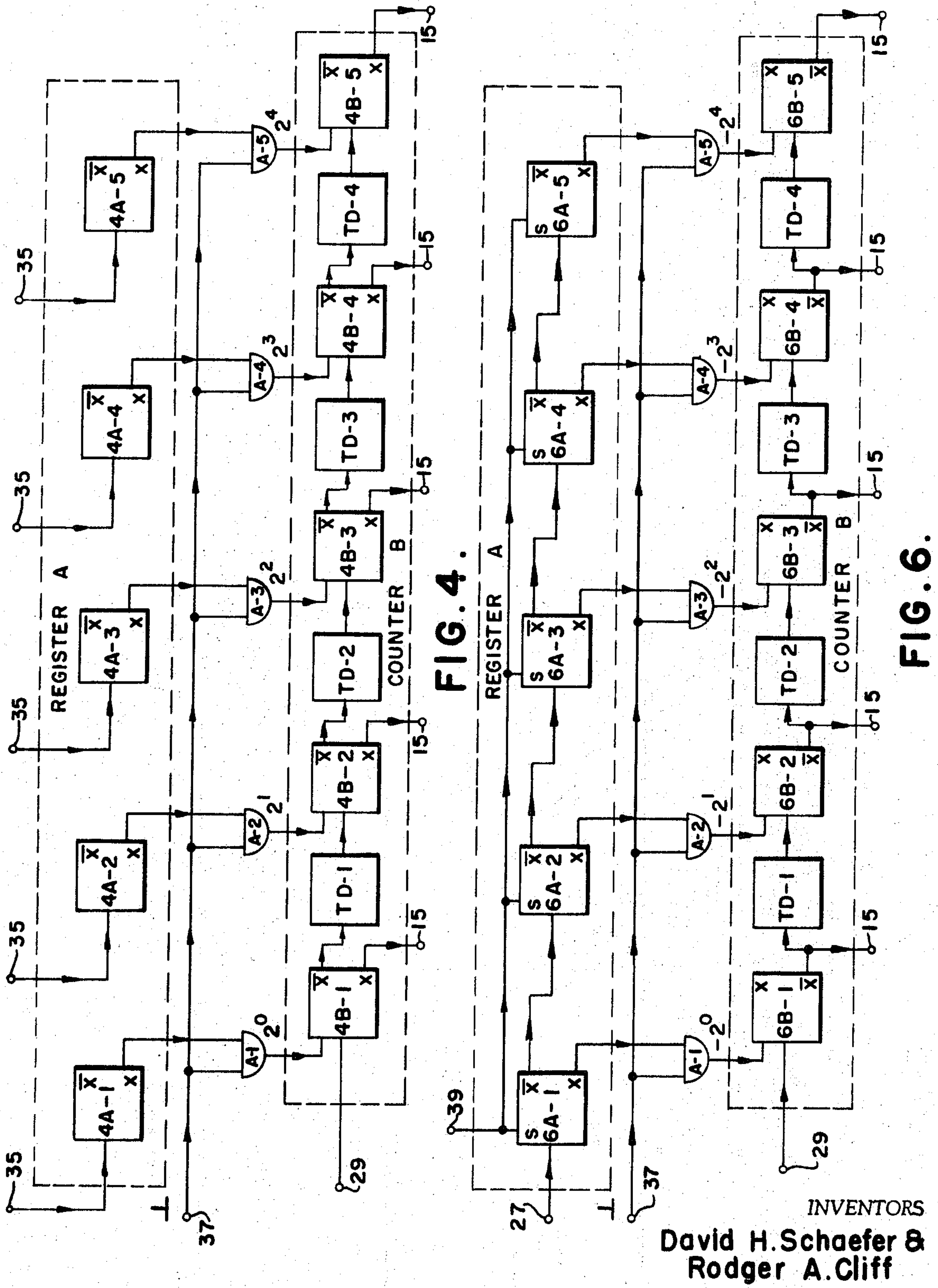
FIG. 4 is a block diagram illustrating a second system made in accordance with the invention for adding one binary number to a second binary number.
FIG. 6 is a second block diagram illustrating a second system made in accordance with the invention for subtracting one binary number from a second binary number.

FIG. 4 illustrates an alternative embodiment of the invention suitable for adding a number in a register to a number in a counter with a time delay means to prevent erroneous operation. Specifically, the system illustrated in FIG. 4 comprises a register designated as register A and a counter designated as Counter B. Both the register and the counter are five-stage devices with register A's stages designated as 4A–1 through 4A–5 and Counter B's stages designated as 4B–1 through 4B–5. Register A's stages are not coupled together, but, each stage is connected to a separate input terminal 35. The input terminals of register A could be connected to a memory device for the parallel readout of binary numbers contained in the memory, for example.

The connection of Counter B is identical to Counter B of FIG. 3 except that the output of each stage of Counter B is connected through a time delay prior to insertion into a subsequent stage. Specifically, the $\overline{X}$ output of 4B–1 is connected through a first time delay TD–1 to the input of 4B–2; the $\overline{X}$ output of 4B–2 is connected through a second time delay TD–2 to the input of 4B–3; the $\overline{X}$ output of 4B–3 is connected through a third time delay TD–3 to the input of 4B–4; and the $\overline{X}$ output of 4B–4 is connected through a fourth time delay TD–4 to the input of 4B–5. The X outputs of Counter B's stages are individually connected to the plurality of output terminals 15. The input to the first stage of register B is connected to the input terminal 29.

As in the embodiment of the invention illustrated in FIG. 3, five two-input AND gates designated A1 through A–5 are selectively connected between the X outputs of the A register and the separate inputs to the stages of Counter B. That is, the X output of 4A–1 is connected to one input of A–1; and the output of A–1 is connected to the separate input of 4B–1. The X output of 4A–2 is connected to one input of A–2 and the X output of 4A–3 is connected to one input of A–3. The output of A–2 is connected to the separate input of 4B–2 and the output of A–3 is connected to the separate input of 4B–3. Similarly, the X output of 4A–4 is connected to one input of A–4 and the X output of 4A' 5 is connected to one input of A–5; while, the output of A–4 is connected to the separate input of 4B–4 and the output of A–5 is connected to the separate input of 4B–5.

The second inputs to the AND gates A–1 through A–5 are all connected to a terminal 37 which is adapted for connection to a timing pulse source. Hence, when the gates are pulsed by a single pulse from the pulse source, the outputs of the A register are immediately applied to inputs of the B counter. However, due to the time delays connected between the B counter's stages, any time one of its stages is switched, it does not immediately apply its new output to the nxt stage; rather, a period of time occurs which is sufficiently long to allow the next stage to "settle down" after receiving its pulse application from its A register stage. After this settling down period has elapsed, prior pulse stages may apply pulses to subsequent stages and a second settle down period of time passes. Thereafter, a third switching can occur and so on. Hence, the system illustrated in FIG. 4 provides for a settling down period of time after each switching action to prevent erroneous outputs which would result from two inputs being applied to a particular stage at the same time.

It will be appreciated that the system illustrated in FIGS. 3 and 4 provides a simple apparatus for adding one binary number to a second binary number. Preferably, the second binary number is contained in a counter; however, the first binary number can be in a counter or in a register. Further, the register can be a parallel register as illustrated in FIG. 4 or it can be a serial or shift register. It is the interconnection between "A" and "B" that provides the addition function not the type of counter or register which "A" happens to be. Moreover, FIGS. 3 and 4 illustrate alternative systems for providing a "settling down" period for each stage to prevent erroneous outputs. It will be obvious to those skilled in the art, however, that other suitable means can be used to perform this function.

Figure 5:
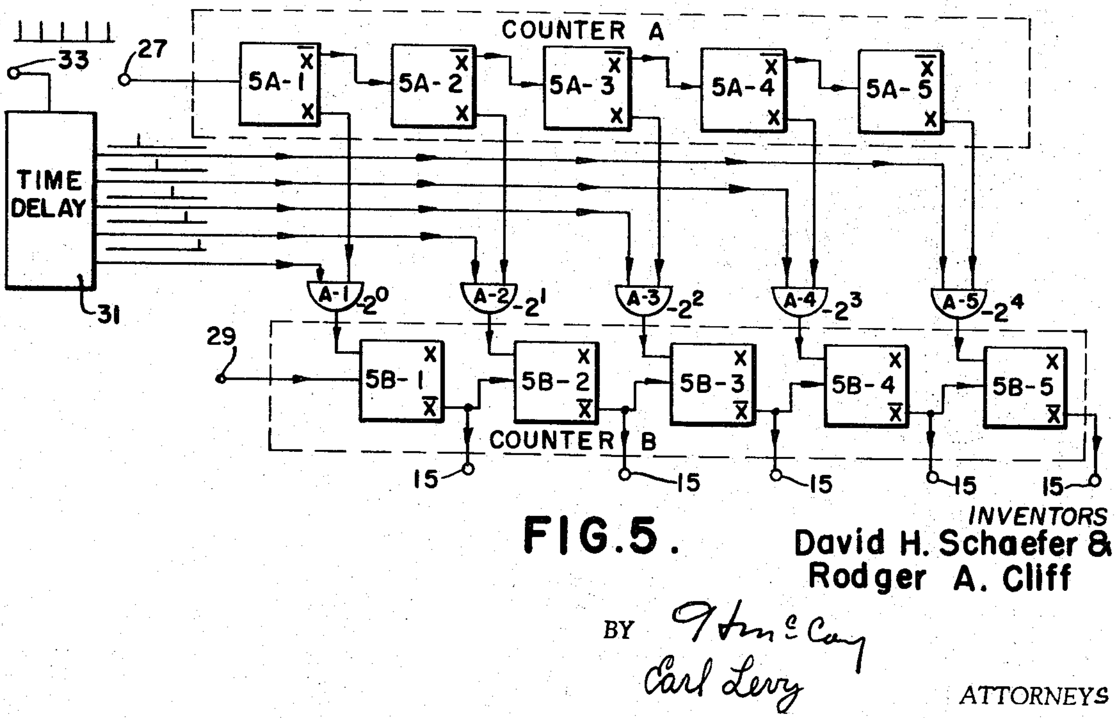
FIG. 5 is a block diagram illustrating one system made in accordance with the invention for subtracting one binary number from a second binary number.

FIG. 5 illustrates one system for subtracting one binary number from a second binary number. Essentially, the system illustrated in FIG. 5 is similar to the system illustrated in FIG. 3; the only change is that Counter B is a backward counter as opposed to the forward counter of FIG. 3. All this means is that the outputs are taken from the $\overline{X}$ side of the counter's stages as opposed to the X side. Except for this change, the system illustrated in FIG. 5 is identical to the system illustrated in FIG. 3. Specifically, Counter A includes five stages designated as 5A–1 through 5A–5. The input to the first stage is connected to an input terminal 27. The B counter also includes five stages designated as 5B–1 through 5B–5. Five AND gates are connected between the counters and to a time delay system in the manner illustrated in FIG. 3 and discussed above. The input to the first stage of Counter B is connected to an input terminal 29.

In operation, register B counts down, or backs up, by a count of one for each input pulse. Similarly, each separate input to each stage counts down by the power of 2 represented by that stage. For example, if the Counter B contains the number 10110 as seen at the output terminals 15, which is equal to the decimal number 13 and Counter A contains the number 11010, which is equal to the decimal number 11, the A number can be subtracted from the B number. Specifically, the output from 5A–5 is first applied through A–5 to the separate input of 5B–5 by the first timing pulse. This is a 0 input to that stage, hence the binary number in register B remains 10110.

When the input from 5A–4 is applied to 5B–4, it switches 5B–4. That is, 5B–4's $\overline{X}$ output which was previously a 1 switches to a 0 and its X output switches from 0 to 1. However, because the X output is unconnected it has not effect. Further, because the $\overline{X}$ output of 5B–4 switches to 0 it applies no switching signal to the input of 5B–5. Hence, 5B–5 does not change. At this point the output is 10100.

Next, the 5A–3 output is applied through A3 to 5B–3. Because it is a 0, it causes no change in the output of 5B–3 and, hence, no change in the output of 5B–4. At this point, the output is still 10100.

The next change is a 1 applied by 5A–2 through A–2 to 5B–2. This switches the output of 5B–2 from a 0 to a 1. When the output of the $\overline{X}$ side of 5B–2 switches from a 0 to a 1, it triggers 5B–3 to switch its $\overline{X}$ output from a 1 to a 0. The now 0 output of $\overline{X}$ of 5B–3 does not change 5B–4. Hence at this point, the output is 11000. The 1 applied by 5A–1 through A–1 to 5B–1 switches its $\overline{X}$ output of 1 to 0; when $\overline{X}$ switches to a 0, it does not change 5B–2. Hence, the resulting output signal is 01000. This represents the decimal number 2; and 13 minus 11 equals 2. Hence, the system operates to subtract one binary number from a second binary number. The time delay system provides for a setting down function in the same manner hereinabove described with respect to the addition systems of FIGS. 3 and 4. Hence, that portion of this embodiment will not be further discussed.

FIG. 6 illustrates a second apparatus for subtracting one binary number from a second binary number, and is similar to the addition system illustrated in FIG. 4. One change is that the outputs of the B counter are taken from the $\overline{X}$ side of the B stages as opposed to being taken from the X side of the stages, thereby making B a backward counter. The second change is that register A is a shift register as opposed to the parallel register illustrated in FIG. 4.

The system illustrated in FIG. 6 comprises a five stage shift register A with the stages designated as 6A–1 through 6A–5. It includes five AND gates designated as A1 through A–5, and it also includes a five stage counter B with its stages designated as 6B–1 through 6B–5. Four time delay networks are also provided. One is located between 6B–1 and 6B–2; one between 6B–2 and 6B–3; one between 6B–3 and 6B–4; and the last is located between 6B–4 and 6B–5. The outputs at terminals 15 are connected to the $\overline{X}$ side of the B counter's stages. An input terminal 27 is connected to the input of the first stage of the A register and an input terminal 29 is connected to the input of the first stage of the B register. A shift input terminal 39 is commonly connected to the shift terminals of all of the stages of the shift register A. Further, a time pulse input 37 is commonly connected to the second input of all of the AND gates. The first input of each of the AND gates is connected to the X side of one of the A register stages in the manner illustrated in FIG. 4 and the output of each AND gate is connected to a separate input of the counter B stages also in the manner illustrated in FIG. 4.

The system illustrated in FIG. 6 operates identically with the system illustrated in FIG. 5. That is, the B counter, because of its connection is a backward counter. Hence, the binary values from the A register are subtracted from the B register in the manner hereinabove described with respect to FIG. 5. The individual time delay systems provide a setting down period for each B stage after it is triggered by an A stage in the manner described with respect to FIG. 4.

It will be appreciated that the structure of FIGS. 5 and 6 is a simple system for subtracting one binary number from a second binary number; while the structure of FIGS. 3 and 4 is a simple system for adding one binary number to a second binary number. It will also be appreciated that none of the systems require separate add or subtract stages to provide the respective addition or subtraction function. The number to be added or subtracted is directly added to or taken from the number to which it is to be added to or subtracted from. Hence, a very simple apparatus for adding or subtracting numbers directly has been provided. The systems are less susceptible to failure because they eliminate the necessity of separate systems to add and subtract and thereby reduce the number of components that are necessary to prior art devices. Further, the elimination of components reduces weight and size.

It will be appreciated by those skilled in the art and others, that although the description has been directed to five stage devices, any number of stages can be utilized when connected in the manner hereinabove described. Hence, the invention may be practiced otherwise than as specifically described herein.

What is claimed is:

1. Apparatus for performing an arithmetic operation between two binary numbers comprising:

a first binary means having a plurality of stages for storing a first binary number;

a second binary means having a plurality of stages for storing a second binary number; and a gating means for selectively interconnecting the outputs of the stages of said first binary means to the inputs of the stages of the second binary means; said gating means further including a time delay means for generating timing pulses and a plurality of AND gates each having at least a first input, a second input, and an output, said first input of each AND gate connected to an output of one stage of said first binary means, said second input of each AND gate connected to said time delay means, and said output of each AND gate connected to the input of the stage of said second binary means that corresponds to the stage of said first binary means to which said first input of said AND gate is connected.

2. Apparatus as claimed in claim 1 wherein each of said stages of said first binary means are serially connected and wherein each of said stages of said second binary means are serially connected.

3. Apparatus for performing an arithmetic operation between two binary numbers comprising:

a first binary counter having a plurality of stages for storing a first binary number;

a second binary counter having a plurality of stages for storing a second binary number;

a gating means for selectively interconnecting the outputs of the stages of said first binary means to the inputs of the stages at the second binary means, said gating means further including a plurality of AND gates, each having at least a first input, a second input, and an output, said first input of each AND gate adapted for connection to a pulse source, said second input of each AND gate connected to the true output of the stage of said binary register with which it cooperates, and said output of each AND gate connected to the input of the stage of said binary counter that corresponds to the stage of said binary register to which said second input of said AND gate is connected; and wherein a time delay means is connected between the complementary output of each stage and the input of the next higher-order stage of said binary counter.

4. Apparatus for performing an arithmetic operation between two binary numbers comprising a first binary counter having a plurality of stages for storing a first binary number;

a second binary counter having a plurality of stages for storing a second binary number;

a gating means for selectively interconnecting the outputs of the stages of said first binary means to the inputs of the stages at the second binary means, said gating means further including a common terminal and wherein said gating means includes a plurality of AND gates, each having at least a first input, a second input, and an output, said first input of each AND gate connected to the output of one stage of said first binary counter, said second input of each AND gate connected to said common terminal, and said output of each AND gate connected to the input of the stage of said second binary counter that corresponds to the stage of said binary counter to which said first input of said gate is connected.

5. Apparatus of claim 4 further including a time delay means connected between adjacent stages of said second binary counter.

References Cited

UNITED STATES PATENTS 2,719,670 10/1955 Jacobs et al. -------- 235—175

OTHER REFERENCES

West and De Turk: Digital Computer for Scientific Applications. In Proc. of I.R.E., December 1948, p. 1457.

MALCOLM A. MORRISON, Primary Examiner

R. S. DILDINE, JR., Assistant Examiner

U.S. Cl. X.R.

235—92